July 12, 1927.
W. T. NARDIN
1,635,975
COUPLING FOR TIRE CHAINS
Filed Aug. 31, 1926
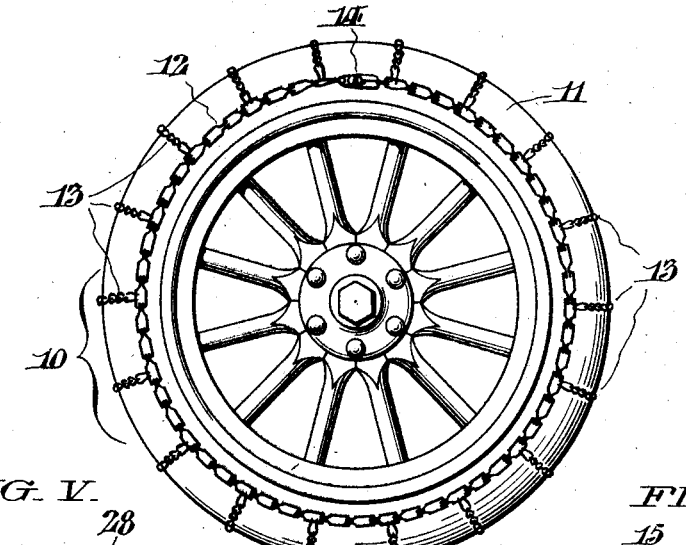
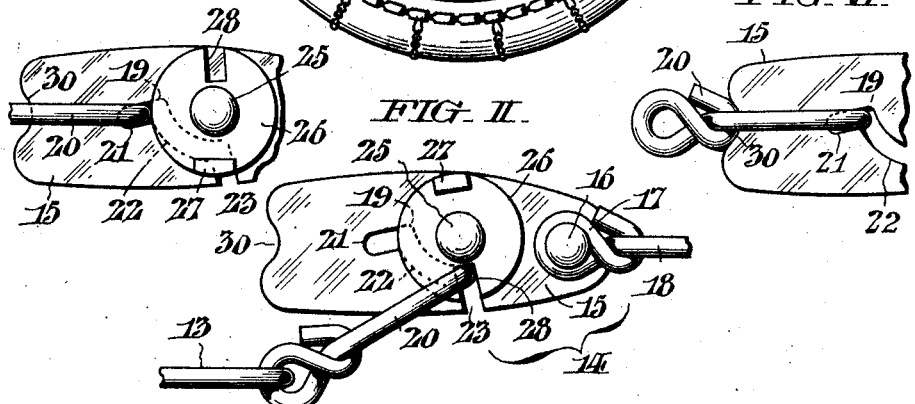
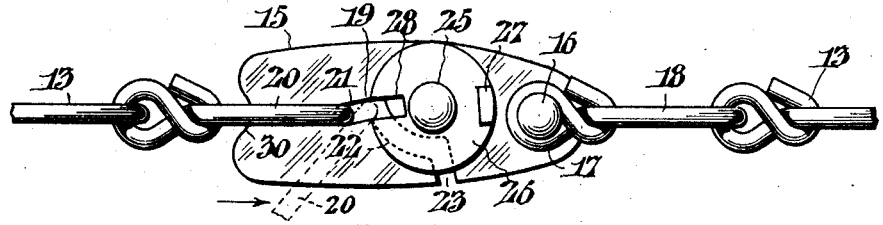
WITNESSES:
John C. Bergner
John A. Weidler
INVENTOR:
William T. Nardin,
BY
ATTORNEYS.

Patented July 12, 1927.

1,635,975

UNITED STATES PATENT OFFICE.

WILLIAM T. NARDIN, OF MOORESTOWN, NEW JERSEY, ASSIGNOR TO GEORGE J. CAMPBELL, OF PHILADELPHIA, PENNSYLVANIA.

COUPLING FOR TIRE CHAINS.

Application filed August 31, 1926. Serial No. 132,673.

This invention relates to devices for coupling the ends of chains, and, while generally applicable in other connections as will be apparent from subsequent description, it is more particularly useful with non-skid chains such as ordinarily employed for vehicle tires.

Amongst the objects of my invention are to facilitate application and removal of tire chains from vehicle wheels, as well as to insure such chains against becoming accidentally detached while in use; and, with these ends in view, to provide a very simple coupling adapted to be permanently attached to one extremity of the chain with capacity for very easy and quick connection to—and disconnection from—the other extremity of the chain.

A further object of my invention is to secure the above advantages in a chain coupling which is sturdy, reliable, durable and conducive to ready and economical manufacture.

In the drawings herewith, Fig. I shows a vehicle wheel and a tire chain with coupling devices of my invention.

Fig. II is a detail plan view of the coupling, on a larger scale, illustrating the manner in which it is manipulated incidental to application and removal of the non-skid chain from the vehicle wheel.

Fig. III is a view similar to Fig. II but showing the device in the coupled position.

Fig. IV is a side view of the parts depicted in Fig. III.

Figs. V and VI are fragmentary views illustrative of certain features of my invention.

With reference first more particularly to Fig. I of the drawings, 10 indicates a vehicle wheel with a pneumatic tire 11 surmounted by a non-skid chain structure comprising a pair of circumferential components 12—only one of which is visible in the illustration—and a series of uniformly-spaced transverse sections 13 extending between said circumferential components over the tread of the tire 11 in accordance with common practice. My novel coupling is comprehensively designated by the numeral 14 in Fig. I, and is shown as connecting together the opposite extremities of the visible chain component 12; while it is to be understood that another such coupling 14 is employed at a corresponding point in the circumferential chain component at the concealed side of the wheel.

Attention is now directed to Figs. II, III and IV, from which it will be observed that my novel coupling 14 comprises a member 15 which may be conveniently fashioned to the configuration shown by die stamping from plate metal of adequate thickness and strength to resist all longitudinal and torsional strains likely to be imposed upon it. The member 15 is permanently attached to one extremity of the chain 13 by means of a rivet 16 passing through eyes 17, 17 of the end link 18. At about the middle (with regard to its length) the member 15 has a vari-directional slot 19 designed for reception of the end link 20 at the other extremity of the chain 13. As shown, this slot 19 is formed with a straight terminal spur 21 that is inclined somewhat relative to the longitudinal axis of the member 15 in a direction away from a communicating lateral arcuate approach 22 having an entrant notch 23 open from one side edge of said member. Now it is to be particularly noted that the rounded end of the terminal spur 21 and the rivet 16 both lie in the longitudinal axis of the member 15, wherefore any pull as between the coupled extremities of the chain 13, is shared between these two points and the coupling thus held aligned with said chain.

Rotatable about a stud 25 outstanding from one side of the member 15, is a keeper 26 having the form of a circular disk which overlaps the vari-directional arcuate portion 22 of the slot 19 in the member 15, and it is provided with an integral projecting lug 27 for convenience in manipulation. Diametrically opposite the lug 27, the keeper 26 has a notch 28 capable of registry alternately with the entrant notch 23 and the terminal spur 21 of the vari-directional slot 19 when said keeper is turned.

Manipulation of the coupling 14 and the chain 13 in engaging the end link 20 of the latter is as follows: The keeper 26 is first positioned with its edge notch 28 in registry with the entrant notch 23 of the vari-directional slot 19, whereupon the end link 20 is inserted after the manner depicted in Fig. II. Then, by clockwise movement of the keeper 26 (imparted either by means of its lug 27 or through pull on the chain 12) the link 20 is guided, by way of the arcuate approach portion 22 of the vari-directional slot 19, into the terminal spur 21 of the latter, whereupon it is free to align itself with the coupling 14 and the rest of said chain. After the link 20 has been engaged as explained, the keeper 26 may be further turned as shown in Fig. V—to bring its notch 28 beyond the province of the spur 21 of the vari-directional slot 19, thereby to lock the chain extremities against separation. Even though the precaution just described is neglected, it is quite impossible for the link 20 to free itself since, even if displaced to a position such as shown in dotted lines in Fig. III and concurrently urged longitudinally in the direction of the arrow, the terminal spur 21 of the vari-directional slot 19, by virtue of its inclination, will tend to guide it away from the lateral arcuate approach 22, see Fig. VI. As a further safeguard against release of the chain 13, the end of the member 15 occupying the hollow of the link 20 is so proportioned as to restrict longitudinal movement to an extent preventing said link from riding out of the terminal spur 21 of the slot 19; and, in addition, a recession 30 is preferably provided at the end of the member 15 to further co-operate with the link 20 (Fig. VI) incidental to the circumstance mentioned, and thus prevent it from swinging about the slot spur 21 as an axis. Disengagement of the coupling 14 is of course effected in a reverse manner to that above described.

Having thus described my invention, I claim:

1. A chain coupling comprising a member adapted to be permanently attached to one end of the chain and having a slot with a terminal spur and a vari-directional lateral approach for reception of the end link at the other extremity of the chain, the terminal spur of such slot being inclined somewhat relative to the longitudinal axis of the member in a direction away from the approach aforesaid.

2. A chain coupling comprising a member adapted to be permanently attached to one end of the chain and having a slot with a terminal spur and a vari-directional lateral approach for reception of the end link at the other extremity of the chain, the terminal spur of such slot being inclined somewhat relative to the longitudinal axis of the member in a direction away from the approach; and a keeper to cooperate in retaining the end link aforesaid.

3. A chain coupling comprising a member adapted to be permanently attached to one end of the chain and having a slot with a terminal spur and an arcuate approach for reception of the end link at the other extremity of the chain, the terminal spur of such slot being inclined somewhat relative to the longitudinal axis of the member in a direction away from the arcuate approach; and a keeper to overlap the arcuate approach for retainment of the end link aforesaid.

4. A chain coupling comprising a member adapted to be permanently attached to one end of the chain and having a slot with a terminal spur and a lateral arcuate approach with a radial entrant notch for reception of the end link at the other extremity of the chain, the terminal spur of such slot being inclined somewhat relative to the longitudinal axis of the member in a direction away from the approach of the latter; and a rotatable keeper to overlap the arcuate portion of the slot for retainment of the end link, said keeper being provided with a radial notch alternately registrable with the terminal spur and entrant notch of the aforementioned slot.

5. A chain coupling comprising a member adapted to be permanently attached to one end of the chain and having a slot with a terminal spur inclined somewhat relative to the longitudinal axis of said member and a lateral approach for engaging the end link at the other extremity of the chain, the projection of the member within the hollow of the link restricting longitudinal movement to an extent preventing said link from riding out of the terminal spur of the aforementioned slot.

6. A chain coupling comprising a member adapted to be permanently attached to one end of the chain and having a slot with a terminal spur inclined somewhat relative to the longitudinal axis of said member and a lateral approach for engaging the end link at the other extremity of the chain, the projection of the member within the hollow of the link restricting longitudinal movement to an extent preventing said link from riding out of the terminal spur of the aforementioned slot, and means providing a recession at the free end of the member aforesaid to engage the link and prevent rotative movement thereof about the slot spur as a center.

In testimony whereof, I have hereunto signed my name at Philadelphia, Pennsylvania, this 24th day of August, 1926.

WILLIAM T. NARDIN.